(12) United States Patent
Otake

(10) Patent No.: US 6,732,521 B2
(45) Date of Patent: May 11, 2004

(54) CONTROL SYSTEM FOR A TURBO-CHARGED DIESEL AIRCRAFT ENGINE

(75) Inventor: Yukio Otake, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/219,494

(22) Filed: Aug. 16, 2002

(65) Prior Publication Data

US 2004/0031267 A1 Feb. 19, 2004

(51) Int. Cl.$^7$ .......................... F02D 23/00; B64C 11/34
(52) U.S. Cl. .................. 60/601; 416/27; 416/30
(58) Field of Search .................. 60/601, 602, 603; 416/27, 30

(56) References Cited

U.S. PATENT DOCUMENTS

| | | | |
|---|---|---|---|
| 4,626,170 A | 12/1986 | Dorsch | 416/30 |
| 5,307,632 A | * 5/1994 | Gottemoller et al. | 60/603 |
| 5,810,560 A | 9/1998 | Tanaka | 416/27 |
| 6,055,810 A | * 5/2000 | Borland et al. | 60/603 |
| 6,151,549 A | * 11/2000 | Andrews et al. | 60/601 |

FOREIGN PATENT DOCUMENTS

| | | |
|---|---|---|
| JP | A 6-50181 | 2/1994 |
| JP | A 8-303271 | 11/1996 |
| JP | A 8-324496 | 12/1996 |
| JP | A 8-326586 | 12/1996 |
| JP | A 10-18861 | 1/1998 |
| JP | A 2001-159356 | 6/2001 |

* cited by examiner

Primary Examiner—Sheldon J. Richter
(74) Attorney, Agent, or Firm—Oliff & Berridge, PLC

(57) ABSTRACT

In the control system for a turbo-charged diesel aircraft engine, the engine speed and the fuel injection amount are controlled by a single control lever in such a manner that the engine speed and the fuel injection amount maintain a predetermined fixed relationship in which the fuel injection amount is always smaller than a smoke limit amount. The control system further includes a boost compensator, that restricts the fuel injection amount to a value less than a boost pressure fuel limit determined by the boost pressure of the engine, and an altitude compensator that restricts the fuel injection amount to the value less than an altitude fuel limit.

6 Claims, 11 Drawing Sheets

CONTROL SYSTEM FOR A TURBO-CHARGED DIESEL AIRCRAFT ENGINE

BACKGROUND OF THE INVENTION

1. Field of the Invention

The present invention relates to a control system for an aircraft engine and, more specifically, it relates to a control system for a turbo-charged diesel engine used for an aircraft equipped with a controllable pitch propeller.

2. Description of the Related Art

A controllable pitch propeller for an aircraft that can change its pitch during operation is known in the art. In an aircraft equipped with a controllable pitch propeller, the engine speed and the engine output power are usually controlled separately. Namely, the aircraft equipped with a controllable pitch propeller is normally provided with a propeller governor that automatically changes the propeller pitch so that the propeller speed becomes a predetermined set speed. Since the power consumption of the propeller changes in accordance with the propeller pitch and the propeller speed, the engine speed (i.e., the propeller speed) changes in accordance with the propeller pitch if the engine output power is kept at constant value.

Further, when a diesel engine is used, engine output is controlled separately from the engine speed by adjusting the amount of fuel injected into the engine. Therefore, in the conventional control system, the pilot of the aircraft is required to adjust a governor lever for changing the set speed of the propeller governor and an accelerator lever for changing the setting value for fuel injection amount (a set amount of fuel) simultaneously in order to obtain a desired engine (propeller) speed and engine output.

However, in the conventional control system, as the pilot is required to operate the governor lever and the accelerator lever at the same time, controlling the operation of the aircraft has become complicated.

To solve this problem, U.S. Pat. No. 5,810,560 proposes a control system for an aircraft engine in which both the set speed of propeller governor and the set amount of fuel injection is controlled by a single control lever. In U.S. Pat. No. 5,810,560, as a gasoline engine is used, the engine output is controlled by adjusting the degree of opening of a throttle valve disposed on the air intake passage of the engine, and the propeller governor and the throttle valve are connected to a single control lever by means of link and cam mechanism, and the set speed of the propeller governor and the degree of opening of the throttle valve change simultaneously in accordance with the stroke of the control lever. Therefore, when the set speed of the propeller governor becomes low, the degree of opening of the throttle valve is also set at a small value, whereby a low speed and low output power operation of the engine is automatically achieved. Similarly, when the set speed of the propeller governor becomes high, as the degree of opening of the throttle valve also becomes large, a high speed and high output power operation of the engine is automatically achieved.

According to the control system in U.S. Pat. No. 5,810,560, as the engine speed and the engine output power are controlled by a single lever, the complexity of controlling the aircraft is largely reduced.

However, when the control system of U.S. Pat. No. 5,810,560 is used for a turbo-charged diesel engine, some problems occur.

In a turbo-charged diesel engine, the intake air amount of the engine is not controlled by a throttle valve and determined by the engine speed and the boost pressure. Therefore, a combustion air-fuel ratio changes in accordance with the fuel injection amount, i.e., the engine load. Consequently, in some operating conditions, if the combustion air-fuel ratio becomes excessively low, exhaust smoke will be formed due to a shortage of combustion air.

In order to prevent the formation of exhaust smoke, a boost compensator is used in some turbo-charged diesel engines. The boost compensator is an apparatus that restricts the fuel injection amount to a value less than a maximum limit (i.e., so called "a smoke limit") corresponding to an allowable lowest air-fuel ratio. The allowable lowest air-fuel ratio is a lowest air-fuel ratio on which the engine can operate without forming exhaust smoke. Since the amount of air charged into cylinders of the engine increases as the boost pressure increases, the maximum limit of the fuel injection amount is determined by the boost pressure.

When the engine speed and the fuel injection amount are simultaneously controlled by a single control lever, the fuel injection amount changes in accordance with the engine speed. In this case, when the engine speed is determined, the fuel injection amount is simultaneously determined. On the other hand, the boost pressure decreases as the altitude increases even if the engine speed is constant, due to a decrease in the atmospheric pressure. Therefore, in some cases, the fuel injection amount exceeds the smoke limit at a high altitude even if the engine speed is not changed.

If the boost compensator as explained above is used in the single control lever system, the boost compensator is activated to restrict the fuel injection amount at a high altitude due to a decrease in the boost pressure, even if the engine is operated in steady operating conditions. In a steady operation of the engine, once the boost compensator restricts the fuel injection amount, boost pressure does not increase any more since sufficient engine power for increasing the boost pressure is not available. Therefore, if the boost compensator is activated in a steady operation of the engine, the fuel injection amount would likely always be controlled to the maximum amount determined by the boost pressure at a high altitude. When the fuel injection amount is controlled by the boost compensator, the fuel injection amount changes in accordance with the boost pressure. This means that, if the boost pressure increases by a small amount, the fuel injection amount is increased by the boost compensator in accordance with the increase in the boost pressure. When the fuel supplied to the engine increases, the boost pressure also increases, due to an increase in the energy supplied to the turbocharger, and the increase in the boost pressure further increases the fuel injection amount.

Therefore, when the fuel injection amount is controlled by the boost compensator during a steady operation of the engine, even a small fluctuation in the boost pressure is amplified to a large change in the boost pressure and the fuel injection amount. In other words, the operation of the engine becomes unsteady.

Therefore, when the single control lever system is used, it is considered not preferable to use the boost compensator.

SUMMARY OF THE INVENTION

In view of the problems in the related art as set forth above, an object of the present invention is to provide a control system for a turbo-charged diesel aircraft engine using a single control lever for controlling an engine speed and a fuel injection amount of the engine and capable of preventing the formation of the exhaust gas smoke without causing instability of the operation of the engine.

The object as set forth above is achieved by a control system, according to the present invention, for a turbo-charged diesel aircraft engine comprising a controllable pitch propeller connected to and driven by the turbo-charged diesel aircraft engine, a propeller governor for controlling the rotational speed of the propeller to a set speed by adjusting the pitch of the propeller, speed setting means for changing the set speed of the propeller governor, accelerator means for changing a set amount of fuel supplied to the engine, fuel supply means for supplying fuel to the engine by an amount determined in accordance with-the set amount, control means for controlling the speed setting means and the accelerator means so that the set speed and the set amount of fuel change simultaneously in accordance with the stroke of a single control lever, and wherein the control means controls the speed setting means and the accelerator means in such a manner that the set speed and the set amount of fuel maintains a predetermined fixed relationship in which the set amount of fuel always becomes smaller than a smoke limit value at the maximum design altitude of the aircraft and determined by the set speed.

According to the present invention, as the fuel injection amount is always set at a value smaller than a smoke limit of the engine at the maximum design altitude of the aircraft. The smoke limit is a maximum amount of fuel that can be fed to the engine without producing exhaust smoke. The smoke limit changes in accordance with the boost pressure of the engine. Therefore, usually, the smoke limit value becomes larger as the set speed of the engine becomes higher. Further, the boost pressure decreases as the altitude of the aircraft increases even if the engine speed is kept constant. Therefore, the smoke limit value becomes smaller as the altitude increases. Consequently, the smoke limit at the maximum design altitude is the smallest value of the smoke limit at the respective set speeds.

In the present invention, the set amount of fuel is changed in accordance with the set speed of the engine, further, the set amounts of fuel at the respective set speeds are kept at a value smaller than the smoke limit value at the maximum design altitude. Since the smoke limit at the maximum design altitude is the smallest value of the smoke limits at the respective set speeds, the set amount of fuel in the present invention never exceeds the smoke limit at any altitude. Thus, according to the present invention, the formation of exhaust smoke is suppressed over the whole altitude range of the aircraft operation.

Further, the control system may be provided with a boost compensator and an altitude compensator. The boost compensator restricts the set amount of fuel determined by the operation of the single control lever to a value less than the smoke limit determined by the boost pressure. Therefore, if the boost compensator is provided, the formation of the exhaust smoke can be effectively suppressed even in a transient operation (such as an acceleration) of the engine. Further, the altitude compensator restricts the set amount of fuel determined by the operation of the single control lever to a value less than a maximum amount of fuel to avoid overrunning the turbocharger. This maximum amount of fuel (an altitude fuel limit) is determined in accordance with the altitude of the aircraft. Therefore, if the altitude compensator is provided, the set amount of fuel is always kept at a value smaller than the altitude fuel limit and overrunning of the turbocharger does not occur.

BRIEF DESCRIPTION OF THE DRAWINGS

The present invention will be better understood from the description, as set forth hereinafter, with reference to the accompanying drawings in which.

DESCRIPTION OF THE PREFERRED EMBODIMENT

Hereinafter, embodiments of the control system for a turbo-charged diesel aircraft engine according to the present invention will be explained with reference to FIGS. 1 through 11.

Figure 1:
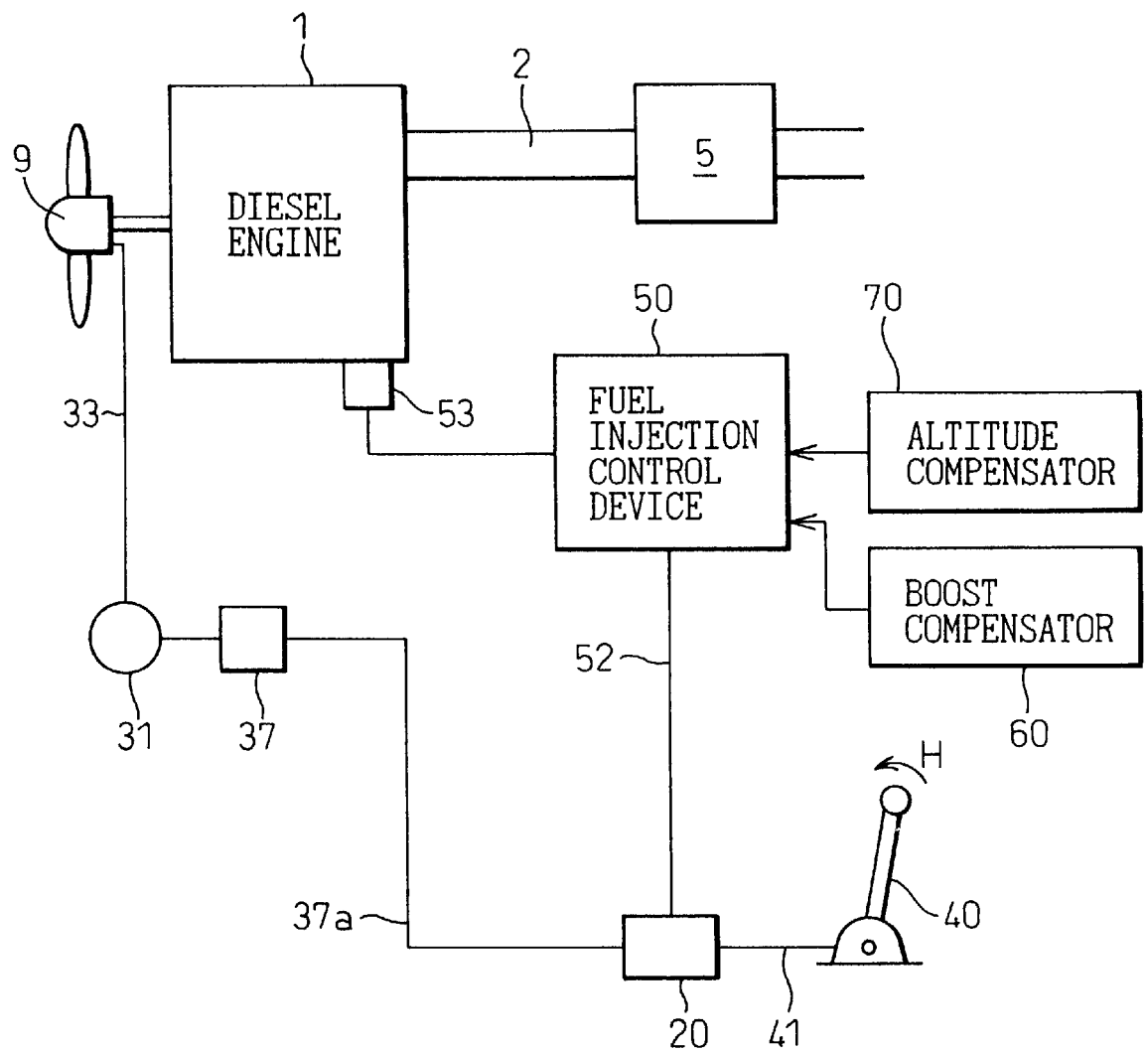
FIG. 1 shows an arrangement of an embodiment of the control system according to the present invention.

FIG. 1 schematically illustrates an embodiment of the single lever control system according to the present invention. In FIG. 1, numeral 1 designates an internal combustion engine for an aircraft. In this embodiment, the engine 1 is a multiple-cylinder type turbo-charged diesel engine. Numeral 2 designates an intake air passage of the engine 1. In the intake air passage 2, a turbocharger 5 for pressurizing intake air of the engine is disposed.

In FIG. 1, numeral 9 designates a controllable pitch propeller connected to an output shaft of the engine 1 and numeral 31 designates a propeller governor, which is connected to the engine output shaft via a driving shaft not shown in the drawing. The propeller governor 31 is a conventional centrifugal type governor that controls the rotational speed of the propeller 9 (i.e. engine speed) at a set speed by changing the pitch of the propeller 9. When the propeller speed becomes higher than the set speed, the propeller governor 31 increases the pitch of the propeller 9. When the propeller pitch is increased, the torque absorbed by the propeller increases, and, due to the increase in the engine load, the engine speed (propeller speed) decreases accordingly. On the contrary, when the propeller speed becomes lower than the set speed, the propeller governor 31 decreases the pitch of the propeller 9 and, thereby, the torque absorbed by the propeller decreases and the engine speed increases. Thus, the engine speed (propeller speed) is controlled to the speed set by the propeller governor 31. The propeller governor 31 and a variable pitch mechanism of the propeller 9 are connected each other by a control oil pipe 33.

In FIG. 1, numeral 50 designates a fuel injection control device. The fuel injection control device 50 comprises a fuel pump (not shown) for supplying pressurized fuel to the injection valves 53 (only one fuel injection valve 53 is shown in FIG. 1) disposed on the respective cylinders of the engine 1 for injecting fuel into the respective cylinders.

In this embodiment, a power lever 40 is provided for adjusting both the set speed of the propeller governor 31 and the fuel injection amount set by the fuel injection control device 50 simultaneously. As shown in FIG. 1, one end of the power lever 40 is connected to a control member 20 by a mechanical link 41. The control member 20 is further connected to the fuel injection control device 50 and a speed setting mechanism 37 of the propeller governor 31 by mechanical links 52 and 37a, such as push and pull cables, respectively. In this embodiment, when the power lever 40 is operated, the control member 20 displaces the mechanical links 52 and 37a simultaneously. The control member 20 includes, for example, a cam mechanism connected to at least one of the links 52 and 37a and, when the power lever 40 is operated, displaces links 52 and 37a in accordance with the amount of operation of the power lever 40. The relationship between the amounts of the displacements of the links 52, 37a and the amount of the operation of the power lever 40 are determined by the profile of the cam mechanism. Therefore, in this embodiment, the amount of the displacement of the link 52 which is connected to the fuel injection control device 50 and the amount of the displacement of the link 37a which is connected to the speed setting mechanism 37 of the propeller governor 31 change simultaneously under a predetermined fixed mutual relationship when the power lever 40 is operated. In other words, the amount of fuel injection set by the fuel injection control device 50 changes in accordance with the set speed of the propeller governor 31 in this embodiment.

In this embodiment, a boost compensator 60 and an altitude compensator 70 are provided. The compensators 60 and 70 restrict the fuel injection amount to a value less than limit values determined by the boost pressure and the altitude when the set amount of fuel injection determined by the fixed relationship with the set speed is larger than either of the limit values. The boost compensator 60 and the altitude compensator 70 in this embodiment will be explained later in detail.

Figure 2:
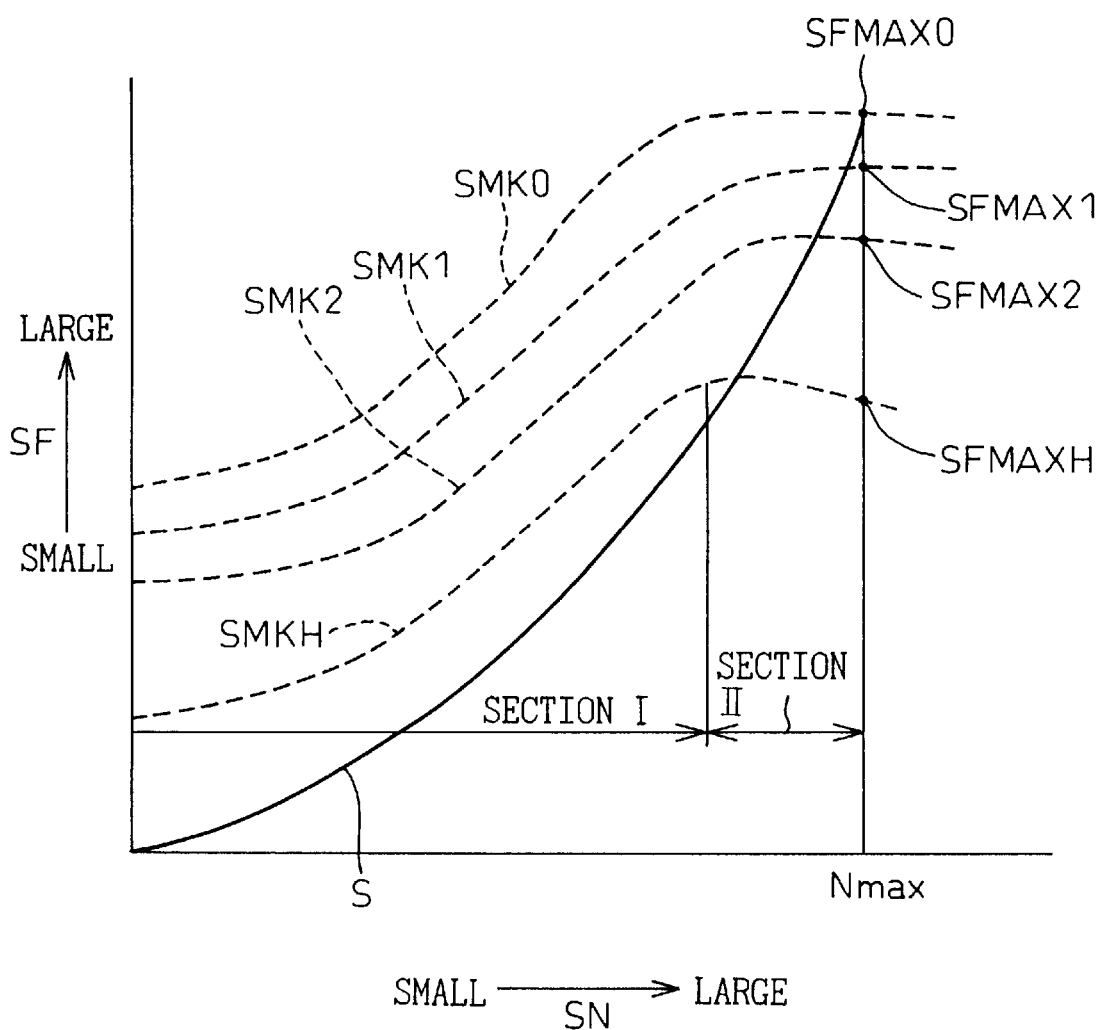
FIG. 2 shows a relationship between the set amount of fuel and the set speed and a change in the smoke limit in accordance with the altitude.

FIG. 2 shows the relationship between the set speed SN set by the propeller governor 31 and the set amount SF of fuel injection set by the fuel injection control device 50. In FIG. 2, the vertical axis represents the set amount SF of fuel injection and the horizontal axis represents the set speed SN. The solid line S represents the relationship between the set amount of fuel SF and the set speed SN. In this embodiment, the relationship between SF and SN is fixed, i.e., the values SF and SN determined by the stroke of the power lever 40 are always on the line S in FIG. 2 regardless of the altitude and engine speed. As shown in FIG. 2, the set amount SF increases as the set speed SN of the propeller (i.e., the engine speed) increases.

In FIG. 2, the broken lines SMK0 to SMKH represent so-called "smoke limits". A smoke limit is a maximum amount of fuel that can be fed to the engine without producing exhaust smoke. Since the maximum boost pressure decreases with the atmospheric pressure, the smoke limit becomes lower as the altitude becomes higher. In FIG. 2, the broken line SMK0 indicates the smoke limit measured on the ground under the atmospheric pressure of 1 bar. The broken line SMK1, SMK2,—and SMKH show the smoke limit at the altitudes A1 A2—and H(H>—>A2>A1), respectively. As shown in FIG. 2, when the engine speed SN is the same, the smoke limit becomes lower as the altitude becomes higher. The broken line SMKH in FIG. 2 shows the smoke limit at the maximum design altitude of the aircraft. The smoke limit SMKH at the maximum design altitude is the smallest value among the smoke limits at the respective set speeds for this aircraft.

As can be seen from FIG. 2, the set amount of fuel SF at the respective values of set speed SN is set at values sufficiently lower than the smoke limit SMKH at the maximum design altitude. Therefore, by setting the fuel injection amount SF in accordance with the relationship with the set speed SN as shown in FIG. 2, the fuel injection amount is always set at a value lower than the smoke limit within the flight altitude range of the aircraft.

However, in this case two problems arise.

First problem is the shape of the smoke limit curves.

As seen from FIG. 2, the respective smoke limit curves are generally composed of two parts. The first part is a smooth slope in which the fuel amount SF uniformly increases as the set speed SN increases (for example, the section I of the curve SMKH in FIG. 2). The second part is the part corresponding to higher set speed SN in which the fuel amount SF does not increase, or even decreases, as the set speed SN increases (for example, the section II of the curve SMKH in FIG. 2).

These horizontal or decreasing parts (such as section II in FIG. 2) appears in the smoke limit curve in the higher set speed SN are required in order to prevent over-speeding of the turbocharger of the engine. When the amount of fuel SF supplied to the engine increases, the rotational speed of the turbocharger increases as the energy given to the turbocharger by the exhaust gas increases as the amount of fuel SF increases. Further, when the speed SN increases, the flow rate of the exhaust gas also increases.

Therefore, in the region where the set speed SN is high, the turbocharger speed increases rapidly due to increase in the fuel supply amount SF and in the engine speed SN. Thus, in the region where the set speed SN is high, the increase in the turbocharger speed must be restricted by restricting the increase in the fuel amount SF in order to keep the turbocharger speed within an allowable maximum speed. The horizontal or decreasing part of the respective smoke limit curves (such as the section II in the SMKH) corresponds to the upper limit of fuel amounts for keeping the turbocharger speed within this allowable maximum limit.

As the density of the air decreases as the altitude increases, the turbocharger speed increases as the altitude becomes higher even if the fuel amount supplied to the engine is the same. Therefore, the upper limit of fuel amounts for keeping the turbocharger speed within the allowable maximum limit becomes smaller as the altitude increases. This upper limit of the fuel supply amount for the protection of the turbocharger is, hereinafter, called as "an altitude fuel limit".

As explained above, the altitude fuel limit changes as the altitude changes. Therefore, if the set amount of fuel SF is determined by the set speed SN based solely on the relationship represented by the curve S in FIG. 2, the set amount SF may exceeds the altitude fuel limit at some altitudes.

Therefore, in this embodiment, the maximum limit SFMAX of the set amount of the fuel SF that corresponds to the altitude fuel limit is determined in accordance with the altitude, and if the set amount of fuel SF determined by the curve S in FIG. 2 exceeds the altitude fuel limit SFMAX at the present altitude, the set amount of fuel SF is replaced by SFMAX.

In this embodiment, the values of the altitude fuel limit SFMAX at the respective altitudes are determined by the following manner.

As explained before, the smoke limit curve varies depending on the altitude and the respective smoke limit curves have two sections. In the first sections of the smoke limit curves, the set amounts of fuel SF always increase uniformly as the set speed SN increases (for example, section I in the curve SMKH in FIG. 2). In this section, the set amount of fuel SF is always smaller than the smoke limit. However, in the second sections of the smoke limit curves, the set amounts of fuel SF do not change or decreases even if the set speed SN increases. Therefore, when the set speed SN is higher than the value where the horizontal or decreasing part of the smoke limit curves cross the curve S, the set amount SF of fuel exceeds the altitude fuel limit.

In this embodiment, the altitude fuel limit SFMAX at each altitude is defined as the value of a set amount of fuel SF of the second section of the smoke limit curve at each altitude when the set speed SN is the maximum rating speed Nmax of the engine. For example, referring to FIG. 2, the altitude fuel limit SFMAX1 at the altitude A1 is defined as the value of the set amount of fuel at the point where the smoke limit curve SMK1 at the altitude A1 crosses the line SN=Nmax. In this manner, the altitude fuel limit SFMAX0, SFMAX1, SFMAX2 and SFMAXH at the ground level, at the altitude A1, A2 and the maximum design altitude AH, respectively are defined as shown in FIG. 2.

Figure 3:
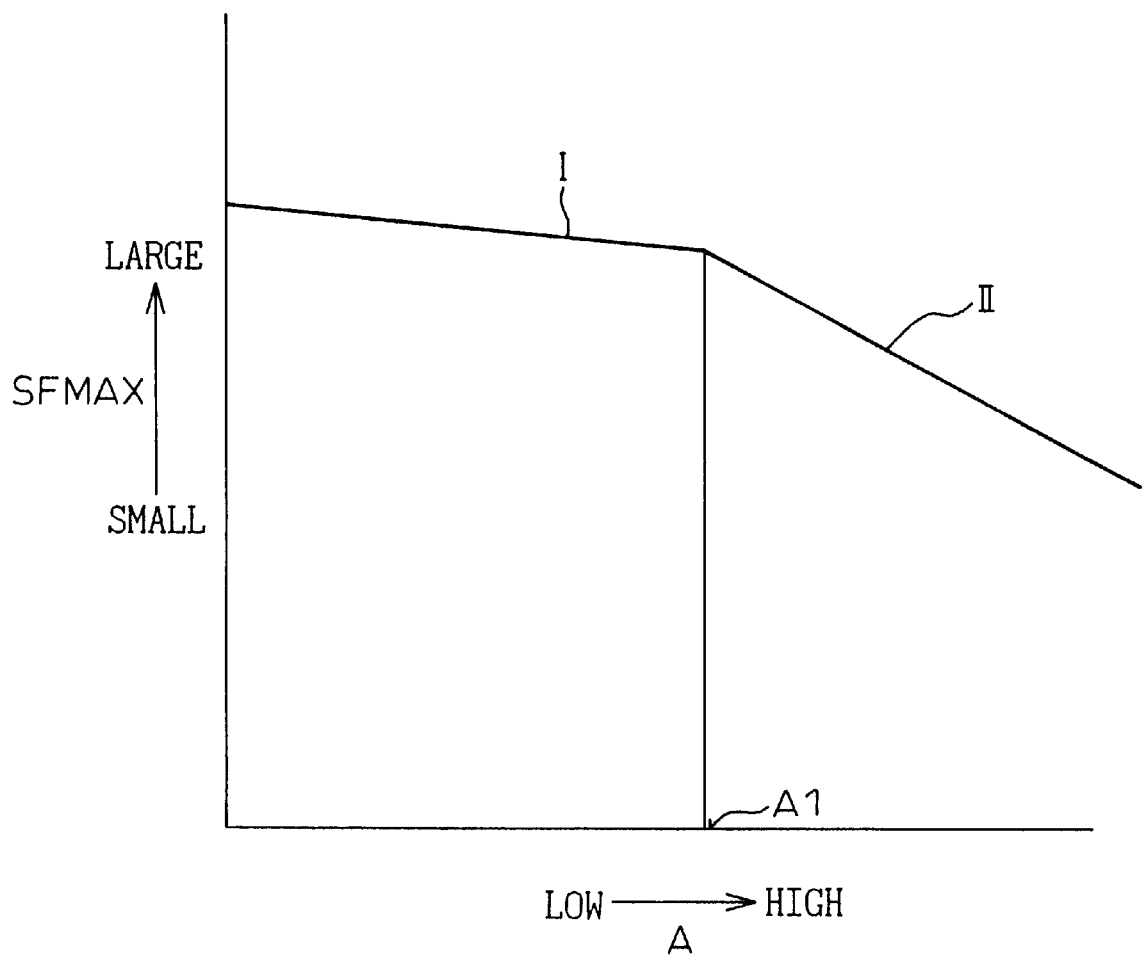
FIG. 3 shows a setting of the altitude fuel limit used in the embodiment in FIG. 1.

The curve M in FIG. 3 shows the relationship between the altitude fuel limit SFMAX and the altitude A used in this embodiment. Though the actual altitude fuel limit SFMAX is a more complicated function of the altitude A than that represented by the curve M, the altitude fuel limit SFMAX is approximately represented by the curve M that consists of two straight lines in order to simplify the control system in this embodiment. As shown in FIG. 3, the altitude fuel limit SFMAX decreases at a constant rate from the ground level (altitude A=0) to an altitude A1, and decreases at a larger rate from the altitude A1. In this embodiment, the altitude compensator 70 restricts the set amount SF to a value lower than the altitude fuel limit SFMAX as explained later in detail.

As explained above, the set amount of fuel injection SF is determined in accordance with the set speed SN based on the relationship represented by the curve S in FIG. 2 in this embodiment. Further, if the set amount of fuel SF determined by the curve S exceeds the altitude fuel limit SFMAX determined by the altitude of the aircraft based on the curve M in FIG. 3, the set amount SF is replaced with the altitude fuel limit SFMAX, i.e., the value SFMAX is used as the set amount in lieu of the value SF. Thus, the set amount of fuel is always restricted to a value less than the altitude fuel limit.

Since the curve S in FIG. 2 is much lower than the smoke limit SMKH at the maximum design altitude of the aircraft, the fuel amount SF is always controlled at the region sufficiently remote from the smoke limit over the whole altitude range during the steady operating condition. Further, the maximum value of the set amount of fuel is always restricted to a value less than the altitude fuel limit SFMAX determined by the altitude based on the curve M in FIG. 3. Thus, during the steady operation of the engine, exhaust smoke is never formed in this embodiment.

However, though the formation of exhaust smoke can be effectively suppressed by controlling the set amount of fuel SF based on the curves S and M in FIGS. 2 and 3 in a steady engine operation in which the engine speed and the engine load do not change largely, the exhaust smoke may be formed during a transient condition, such as acceleration of the engine, even if the set amount of fuel injection is controlled as explained above.

Figure 4:
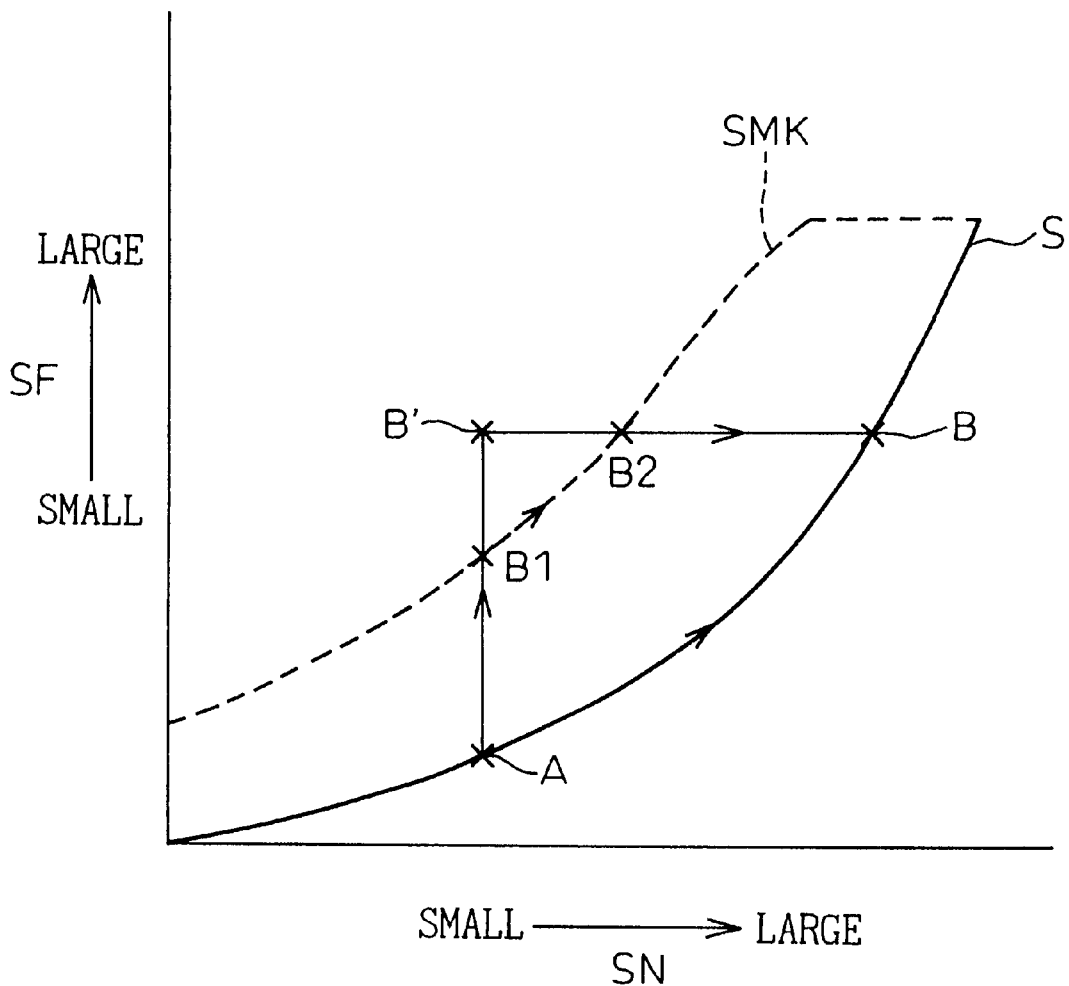
FIG. 4 is a drawing explaining the generation of exhaust smoke during the acceleration of the engine.

This problem is explained, with reference to FIG. 4, in detail. FIG. 4 shows a typical fuel-speed control line S and a smoke limit line SMK at a certain altitude. As explained before, the set amount SF of fuel injection is always controlled so that fuel injection amount changes along the solid line S in a steady operation of the engine and restricted so that it does not exceed the altitude fuel limit SFMAX (not shown in FIG. 4) by the altitude compensator. Therefore, in steady operation, the set amount SF of fuel injection is always kept smaller than the smoke limit SMK and, thereby, the exhaust smoke is not produced in the steady operation.

However, in a transient operation such as acceleration of the engine, when the power lever 40 in FIG. 1 is operated at a relatively high speed, the set speed SN and the set amount of fuel SF change immediately after the power lever 40 is operated. In this case, the actual fuel injection amount is controlled (increased) to the set amount SF corresponding to the stroke of the power lever 40 shortly after the set amount SF is changed. However, the actual engine speed N requires a relatively long time to reach the set speed SN after it is changed.

Therefore, when the engine is accelerated, the actual fuel injection amount may exceed the smoke limit SMK in some cases. For example, consider the case where the power lever 40 is operated in order to accelerate the engine from the point A to point B. In this case, if both of the actual engine speed and the actual fuel injection amount increase immediately, the engine speed and the fuel injection amount moves exactly along the solid line S in FIG. 4 and exhaust smoke is not formed. However, in the actual operation, as the rate of increase in the engine speed is relatively low while the rate of increase in the actual fuel injection amount is relatively high, the operation point of the engine temporarily moves to the point B' before it moves to the point B. Although, after some time elapses, the engine speed increases to the value corresponding to the point B and the operation point eventually moves to the point B, the exhaust smoke is formed when the engine is operated at the point B'.

In order to prevent this problem in the transient condition, a boost compensator 60 is used to restrict the set amount SF of fuel injection to the value less than the smoke limit determined by the actual boost pressure.

As explained above, the smoke limit line SMK is determined by the boost pressure of the engine. Therefore, by restricting the set amount SF of fuel injection to a value less than the smoke limit determined by the actual boost pressure, the actual fuel injection amount never exceeds the smoke limit. In other words, the boost compensator restricts the increase in the fuel injection amount and changes the fuel injection amount along the line A-B1-B2-B in FIG. 4.

In this case, though the fuel injection amount is controlled by the smoke limit SMK in the section between the points B1 and B2, as the engine speed (and the boost pressure) constantly increases in this section, an instability of the engine operation does not occur. As can be understood from FIG. 4, the boost compensator 60 in this embodiment is activated only in the transient operation of the engine in which the engine speed is continuously increases. In other words, the fuel injection amount is controlled by the control line S during the steady-operation of the engine and not controlled by the boost compensator (by the smoke limit line SMK), the boost compensator 60 does not cause any instability of the engine operation as explained before.

As explained above the fuel injection amount and the engine speed are controlled by a single power lever 40 based on the relationship shown by the curve S in FIG. 2 in this embodiment. Further the maximum value of the set amount of fuel injection is always limited to the altitude fuel limit SFMAX and actual smoke limit by the altitude compensator 70 and the boost compensator 60. Thus, the exhaust smoke is effectively suppressed over entire altitude range and during a transient operation as well as during a steady operation of the engine.

Next, the constructions of the boost compensator 60 and the altitude compensator 70 will be explained. In this embodiment, both of the boost compensator 60 and the altitude compensator 70 are constructed as mechanical devices that control the discharge volume controller of the fuel injection pump of the fuel injection control device 50.

Figure 5:
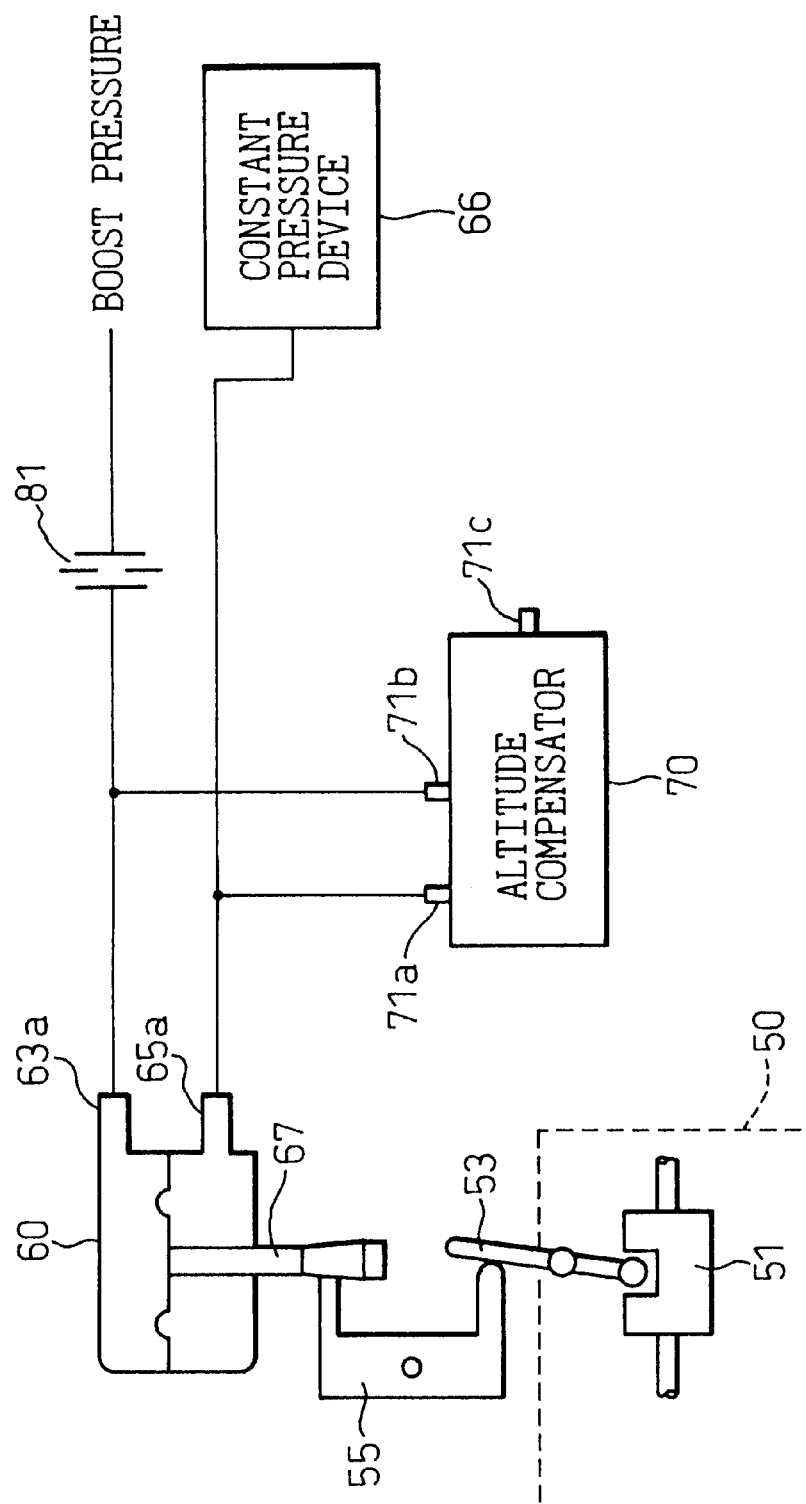
FIG. 5 schematically shows the arrangement of the boost compensator and the altitude compensator in the control system of the embodiment in FIG. 1.

FIG. 5 schematically shows the actual arrangement of the boost compensator 60, the altitude compensator 70 and the fuel injection control device 50.

In this embodiment, the fuel injection control device 50 is provided with a conventional spill ring type fuel injection pump (not shown) in which the discharge amount of fuel injection pump (i.e., fuel injection amount) is determined by the displacement of the spill ring 51 along the rod 51a.

The spill ring 51 is connected to the power lever 40 through the mechanical link 51 and moves in accordance with the movement of the power lever 40. For example, when the power lever 40 is turned to the direction H in FIG. 1, the spill ring 51 is moved toward right direction along the rod 51a in FIG. 5 and the fuel injection amount is increased.

The boost compensator 60 in this embodiment acts as a stopper for limiting the maximum displacement of the spill ring 51 toward the right direction in FIG. 5 in accordance with the boost pressure of the engine. In other words, the boost compensator 60 restricts the fuel injection amount (the position of the spill ring 51) according to the boost pressure of the engine.

Figure 6:
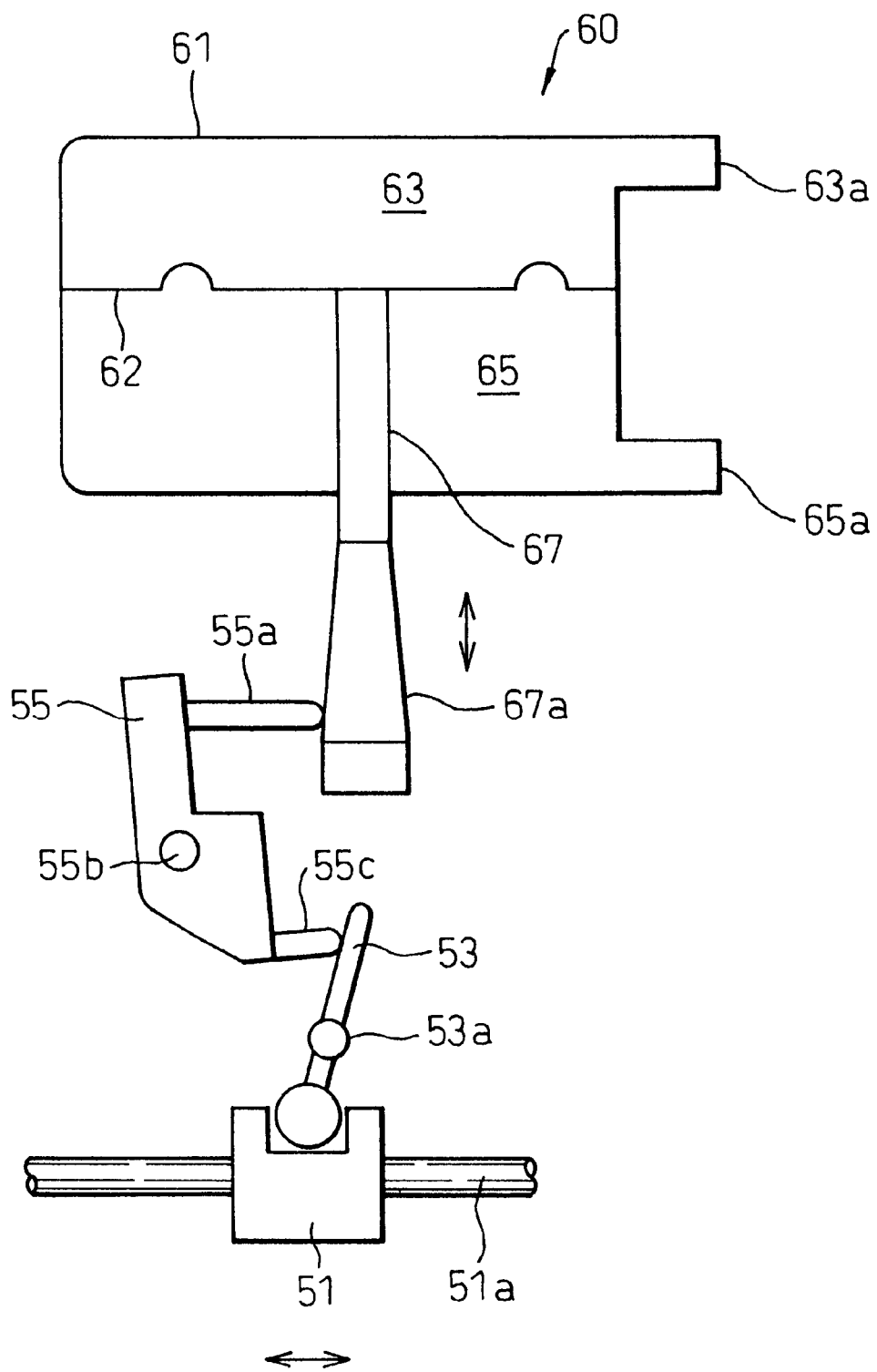
FIG. 6 shows the construction of the boost compensator in FIG. 5.

FIG. 6 shows the detail of the boost compensator 60 in FIG. 5. The boost compensator 60 is provided with a housing 61 in which two chambers 63 and 65 are formed. The two chambers, i.e., a boost pressure chamber 63 and a backpressure chamber 65 are divided by a flexible diaphragm 62. A boost pressure of the engine 1 is introduced to the boost pressure chamber 63 from the port 63a via an orifice 81. The backpressure chamber 65 is connected to a constant pressure device 66 through a port 65a. The constant pressure device 66 generates a constant pressure regardless of the altitude of the aircraft and the operating condition of the engine. Thus, the pressure in the backpressure chamber 65 is always kept at a predetermined constant pressure.

In FIG. 6, numeral 67 designates a control rod connected to the diaphragm 62 and moves together with the displacement of the diaphragm 62. Namely, when the diaphragm 62 deflects upward or downward, the control rod 67 also moves upward or downward accordingly. The amount of the deflection of the diaphragm 62 is proportional to the pressure difference between the boost pressure chamber 63 and the backpressure chamber 65. As the pressure in the backpressure chamber 65 is constant, the amount of the deflection of the diaphragm 62, i.e., the amount of the vertical movement of the control rod 67 is determined by the boost pressure.

The diameter of the control rod 67 varies in the axial direction so that a tapered portion 67a is formed on the control rod 67.

Numeral 55 in FIG. 6 is a control arm capable of pivoting around a center pin 55b. The control arm 55 is provided with a follower 55a, that contacts the side of the control rod 67 at the tapered portion 67a, and a push rod 55c. The push rod 55c of the control arm 55 abuts an end of the tension arm 53 that pivots around a pin 53a. The other end of the tension arm 53 is attached to the spill ring 51 of the fuel injection pump.

In this embodiment, the fuel injection amount is determined by the displacement of the link 52 and the displacement of the spill ring 51. When the set amount SF of the fuel injection is increased, the spill ring 51 is moved to the rightward direction in FIG. 6 by the power lever 40 through the link 52 FIG. 1. When the spill ring 51 moves rightward direction, the tension arm 53 turns to a counterclockwise direction around the pin 53a. This movement of the tension arm 53 is transferred to the control arm 55 by the push rod 55c and the control arm 55 turns toward the clockwise direction until the follower 55a thereof abuts the tapered portion 67a or the control rod 67. Once the follower 55a abuts the control rod 67, the control arm 55 and the tension arm 53 cannot turn any more. Therefore, the movement of the spill ring 51 toward the rightward direction is stopped. Thus, the upper limit of the fuel injection amount is determined by the position of the control arm 55 and, more specifically, the position where the follower abuts the tapered surface 67a of the control rod 67.

As explained above, the control rod 67 is provided with a tapered portion 67a where the diameter of the rod decreases toward the upward direction. When the boost pressure is higher, as the control rod extends downward, the diameter of the tapered portion 67a where the follower 55a of the control arm 55 abuts becomes smaller. This allows the control arm 55 to turn further toward the clockwise direction. Therefore, when the boost pressure is higher, the spill ring 51 is allowed to move further toward rightward direction. In other words, the maximum limit of the fuel injection amount becomes larger as the boost pressure increases.

In this embodiment, the relationship between the maximum fuel injection amount and the boost pressure is determined by the sizes and shapes of the boost compensator 60, the control arm 55 and the tension arm 53 and, these sizes and shapes are selected so that the maximum fuel injection amount coincides with the smoke limit (more specifically, the section I of the smoke limit curves SMK in FIG. 2) at the respective boost pressures. By limiting the maximum fuel injection in accordance with the boost pressure by the boost compensator 60 in this embodiment, the formation of the exhaust smoke is effectively suppressed during the transient operation of the engine as explained in FIG. 4.

Next, the construction of the altitude compensator 70 in this embodiment will be explained in detail. As explained before, the altitude compensator 70 acts as a limiter for restricting the fuel injection amount at a value less than the altitude fuel limit determined by the altitude. The relationship between the altitude fuel limit and the altitude is given by the curve M in FIG. 3 in this embodiment.

In this embodiment, the altitude compensator 70 is constructed as a relief valve for keeping the pressure in the boost pressure chamber 63 of the boost compensator 60 at a limit pressure determined by the altitude (i.e., atmospheric pressure).

Figure 7:
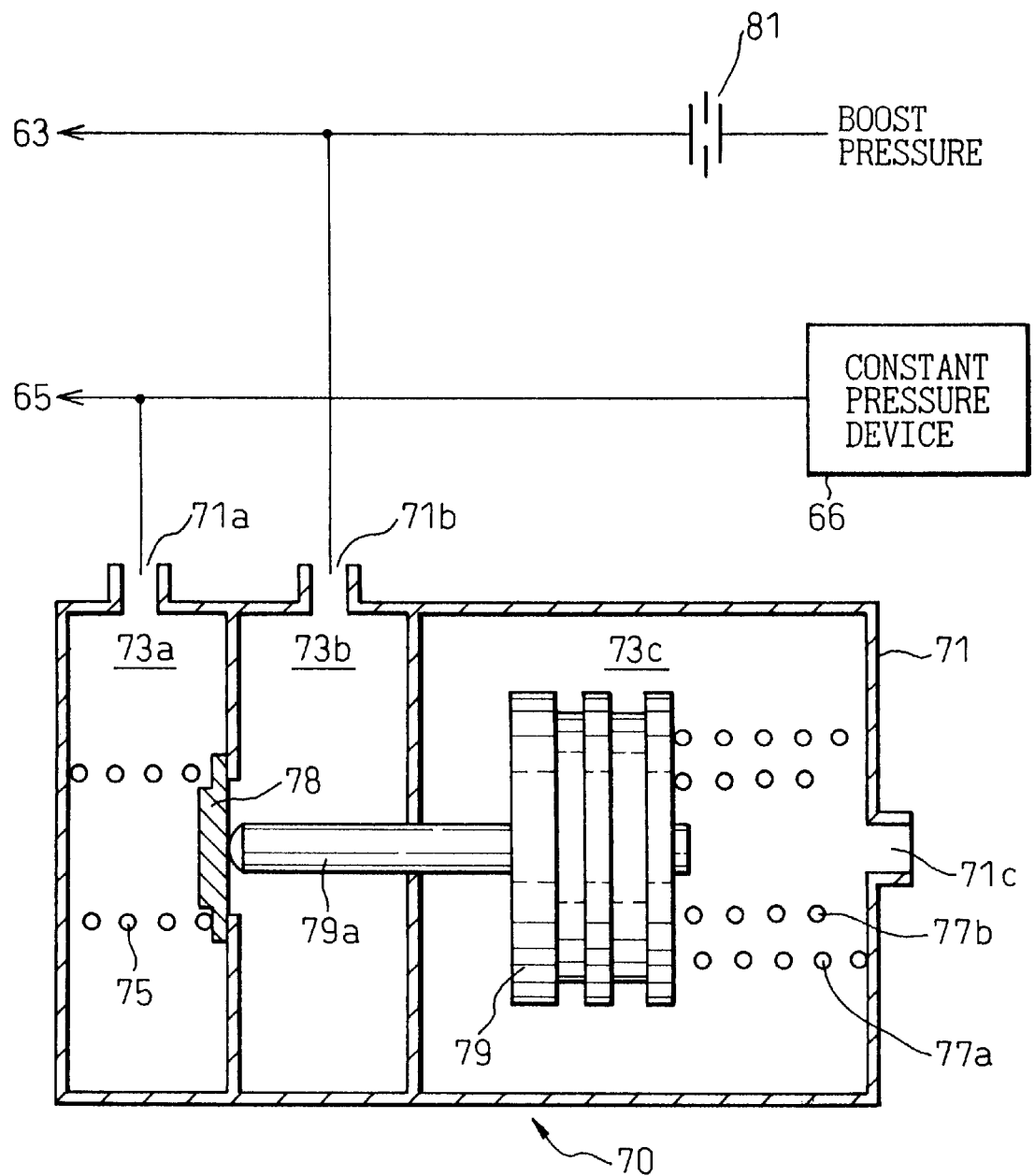
FIG. 7 shows the construction of the altitude compensator in FIG. 5.

In FIG. 7, numeral 70 designates the altitude compensator as a whole. The altitude compensator 70 has a housing 71 the interior thereof being divided into three chambers 73a, 73b and 73c.

The chamber 73a formed at the end of the housing 71 is connected to the backpressure chamber 65 of the boost compensator 60 and the constant pressure device 66 via a port 71a. The chamber 73b located next to the chamber 73a is connected to the boost pressure chamber 63 of the boost compensator 70 via a port 71b. As explained later, when the altitude compensator 70 is activated, the pressure in the boost pressure chamber 63 is relieved through the chambers 73b and 73a to the constant pressure device 66.

Numeral 78 designates a relief valve isolating the chamber 73*a* from the chamber 73*b*. The valve 78 is urged to the closing position by the spring 75.

Numeral 79 in FIG. 7 designates a sealed bellows disposed in the chamber 73*c* located at the end of the housing opposite to the chamber 73*a*. A control rod 79*a* is attached to the sealed bellows 79 and extends through the bulkhead dividing the chambers 73*c* and 73*b*. The tip of the control rod 79*a* is urged against the valve 78. The inside of the sealed bellows 79 is evacuated and maintained at a predetermined vacuum. In the chamber 73*c*, two coil springs 77*a* and 77*b* are disposed at the end of the sealed bellows 79 opposite to the control rod 79*a* and urging the bellows 79 toward the valve 78. The atmospheric pressure is introduced into the chamber 73*c* via a port 71*c*.

In this embodiment, as the pressure in the chamber 73*c* outside of the bellows 79 changes in accordance with the altitude of the aircraft, the length of the bellows changes in accordance with the pressure in the chamber 73*c*. Therefore, the length of the bellows 79 changes in accordance with the altitude of the aircraft. When the altitude of the aircraft is low, i.e., when the atmospheric pressure is relatively high, the bellows 79 is contracted and the length thereof becomes small. When the length of the bellows 79 is smaller than a predetermined length, only the spring 77*a* urges the bellows 79 towards the valve 78 and, when the length of the bellows becomes larger than the predetermined length, both springs 77*a* and 77*b* urge the bellows toward the valve 78. Therefore, the force by which the control rod 79*a* urges the valve 78 changes in accordance with the altitude of the aircraft.

As can be seen from FIG. 7, the pressure in the chamber 73*a* and the urging force of the spring 75 push the valve 78 toward the closed position. On the other hand, the pressure in the chamber 73*b* (the boost pressure) and the control rod 79*a* urge the valve 78 toward the open position.

Since the urging force of the spring 75 and the pressure in the chamber 73*a* are always constant, the force urging the valve 78 toward the closing position (the closing force) is always constant.

On the other hand, the pressure in the chamber 73*b* (the boost pressure) changes in accordance with the operating condition of the engine. Further, the force by which the control rod 79*a* pushes the valve 78 changes in accordance with the altitude. Therefore, when the sum of the forces exerted on the valve 78 by the pressure in the chamber 73*b* and by the control rod 79*a* becomes larger than the closing force, the valve 78 opens. When the valve 78 opens, the pressure in the chamber 63 is relieved through the chamber 73*b*, valve 78 and chamber 73*a* to the constant pressure device 66. Since the line supplying the boost pressure to the boost pressure chamber 63 is throttled by the orifice 81, the pressure in the boost pressure chamber 63 of the boost compensator 60 decreases when the valve 78 opens.

The pressure in the boost pressure chamber 63 at which the valve 78 opens (the opening pressure) changes in accordance with the altitude of the aircraft (i.e. the pressure in the chamber 73*c* of the altitude compensator 70) and the pressure in the boost pressure chamber 63 cannot exceed this opening pressure. Thus, the maximum pressure in the boost pressure chamber 63 is determined by the altitude compensator 70 in accordance with the altitude.

As explained before, the boost compensator 60 restricts the fuel injection amount to a value less than the maximum value determined by the pressure in the boost pressure chamber 63. Therefore, by determining the maximum pressure in the boost pressure chamber 63 in accordance with the altitude by the altitude compensator 70, the maximum fuel injection amount is determined by the altitude. In other words, the altitude fuel limit SFMAX is determined by the altitude compensator 70 in this embodiment.

As explained before, the altitude fuel limit SFMAX changes in accordance with the altitude A in the manner indicated in FIG. 3. The relationship between SFMAX and the altitude A in FIG. 3 is represent by two straight lines I and II having different inclinations. The relationship in FIG. 3 is obtained by the altitude compensator 70 in this embodiment by the cooperation between the bellows 79 and the springs 77*a* and 77*b* as explained below.

In this embodiment, the two springs 77*a* and 77*b* having different lengths are used for urging the bellows 79 of the altitude compensator 70. When the altitude is relatively low and the length of the bellows 79 is relatively short, only the spring 77*a* is compressed between the housing71 and the bellows 79. Therefore, in this condition, the overall spring constant of the spring set (the springs 77*a* and 77*b*) is relatively small. In this condition, the maximum pressure in the boost pressure chamber 63 (i.e., the altitude fuel limit SFMAX) changes in accordance with the altitude along the straight line I in FIG. 3. However, when the altitude reaches a predetermined value (for example, altitude A1 in FIG. 3), as the length of the bellows 79 increases and both springs 77*a* and 77*b* are compressed between the housing 71 and the bellows 79, the overall spring constant of the spring set becomes relatively large. In this condition, the altitude fuel limit SFMAX changes along the straight line II in FIG. 3. Thus, the relationship M between the altitude fuel limit SFMAX and the altitude indicated in FIG. 3 is obtained by the boost compensator 60 and altitude compensator 70 in this embodiment.

Next, the constant pressure device 66 in this embodiment will be explained.

From the above explanation, it will be understood that the back pressure chamber 65 of the boost compensator 60 must be kept at a constant pressure regardless of the operating condition of the engine and the altitude of the aircraft in order to obtain accurate controls of the smoke limit and the altitude fuel limit in this embodiment. In order to keep the constant pressure in the backpressure chamber 65, the constant pressure device 66 is used as shown in FIG. 5.

Figure 8:
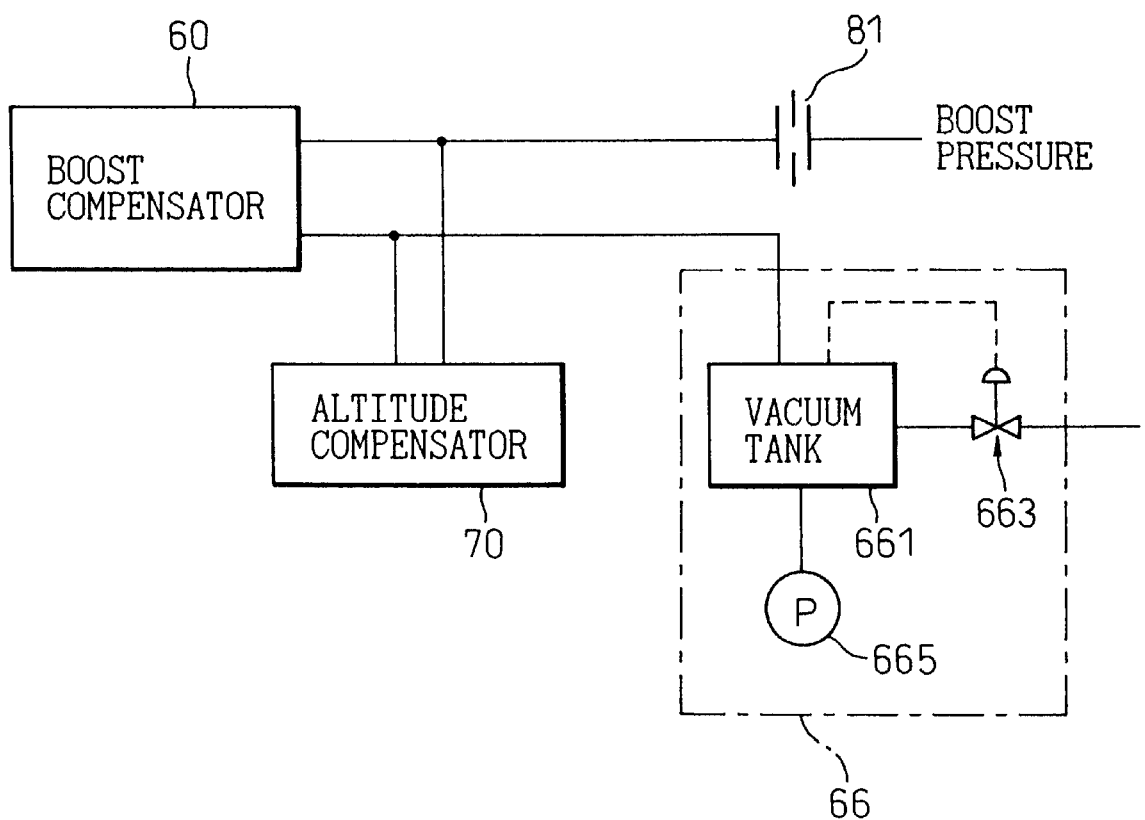
FIGS. 8 and 9 show the examples of the constant pressure device in FIG. 5.

FIG. 8 shows an example of the construction of the constant pressure device 66. In this embodiment, the constant pressure device 66 has a vacuum tank 661 connected to the back pressure chamber 65 of the boost compensator 60, a vacuum pump 665 connected to the vacuum tank 661 and a pressure regulator 663. Any known type of vacuum pump which is capable of producing a vacuum, for example, lower than about 50 KPa can be used for the vacuum pump 665. The vacuum pump 665 is preferably driven by the engine crankshaft or camshaft or, alternatively, the vacuum pump 665 may be driven by an electric motor. The pressure regulator 663 is also known type pressure control valve, which is capable of controlling the pressure in the vacuum tank to a constant pressure of about 50 KPa.

According to the constant pressure device in FIG. 8, the backpressure chamber 65 of the boost compensator 60 is kept at a constant pressure about 50 Kpa regardless of the operating condition of the engine 1 and the altitude of the aircraft.

Figure 9:
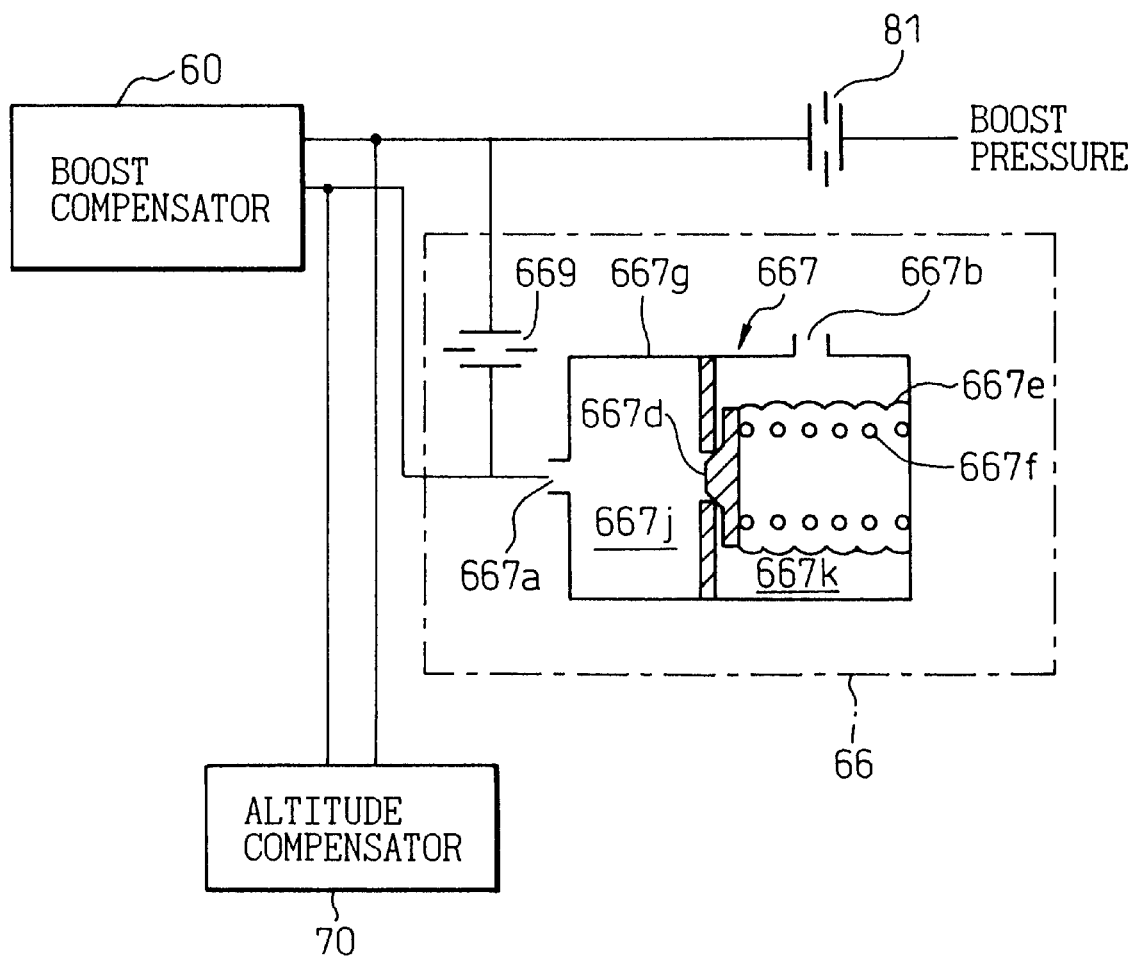

FIG. 9 shows another embodiment of the constant pressure device 66. In the embodiment of the constant pressure device in FIG. 8, the vacuum pump 665 is required for generating a constant pressure.

However, the constant pressure device 66 in this embodiment is different from that in FIG. 8 in that a constant pressure is generated without using the vacuum pump.

The constant pressure device 66 in FIG. 9 generates a constant pressure by reducing the boost pressure by a pressure-reducing valve 667. The pressure reducing valve 667 used in the constant pressure device 66 in this embodiment is a so-called "an absolute pressure relief valve". The absolute pressure relief valve 667 is a valve that is capable of maintaining the pressure in the system lower than a predetermined constant pressure regardless of the ambient pressure.

As shown in FIG. 9, the absolute pressure relief valve 667 has a housing 667g and two chambers 667j and 667k formed in the housing. The chambers 667j and 667k communicate each other through a valve 667d. The chamber 667j is connected to the backpressure chamber 65 and, in this embodiment, the boost pressure is supplied to the chamber 667j through an orifice 669 by a port 667a on the housing 667g. The chamber 667k is communicates to atmosphere through a port 667b. Therefore, when the valve 667d opens, the pressurized boost air is released to the atmosphere through the orifice 669, chamber 667j, valve 667d and the chamber 667k.

As shown in FIG. 9, the valve 667d is urged to its closing position by a compression spring 667f. In this embodiment, a bellows 667e is attached to the backside of the valve 667d and surrounds the compression spring 667f. Further, the bellows 667e is sealed to maintain a predetermined pressure (such as a vacuum pressure, i.e., the pressure lower than the atmospheric pressure on the ground) inside thereof.

Since the backside of the valve body of the valve 667d is completely covered by the bellows 667e, the pressure in the chamber 667k (i.e., the atmospheric pressure) is not exerted on the backside of the valve body of the valve 667d. Therefore, only the force generated by the compression spring 667f and the pressure in the bellows 667e urge the valve body of the valve 667d to the closing position. In other words, the valve body is urged to its closing position by a constant force (a valve closing force).

When the pressure in the chamber 667j increases to a certain pressure (a valve opening pressure), the force exerted on the valve body of the valve 667d by the pressure in the chamber 667j exceeds the above-noted valve closing force and the valve 667d opens. Since the valve closing force is constant, the valve opening pressure in the chamber 667j becomes also constant.

Therefore, the pressure of the boost air supplied through the orifice 669 is reduced to a constant pressure by the absolute pressure relief valve 667. Thus, the pressure in the backpressure chamber 65 of the boost compensator 60 is always kept at a constant value regardless of the engine operating condition and the altitude of the aircraft. In this embodiment, the boost pressure changes, for example, from 100 to 250 KPa, and the backpressure chamber 65 is kept at, for example, 100 KPa.

In accordance with the constant pressure device 66 in FIG. 9, the backpressure chamber 65 of the boost compensator 60 is kept at a constant pressure regardless of the operating condition of the engine 1 and the altitude of the aircraft.

Next, another embodiment of the present invention will be explained. In the previous embodiments, all of the required control is achieved using mechanical devices such as mechanical links 51, 52, the boost compensator 60 and the altitude compensator 70. However, control substantially the same as the previous embodiments can be achieved by an electronic control system.

Figure 10:
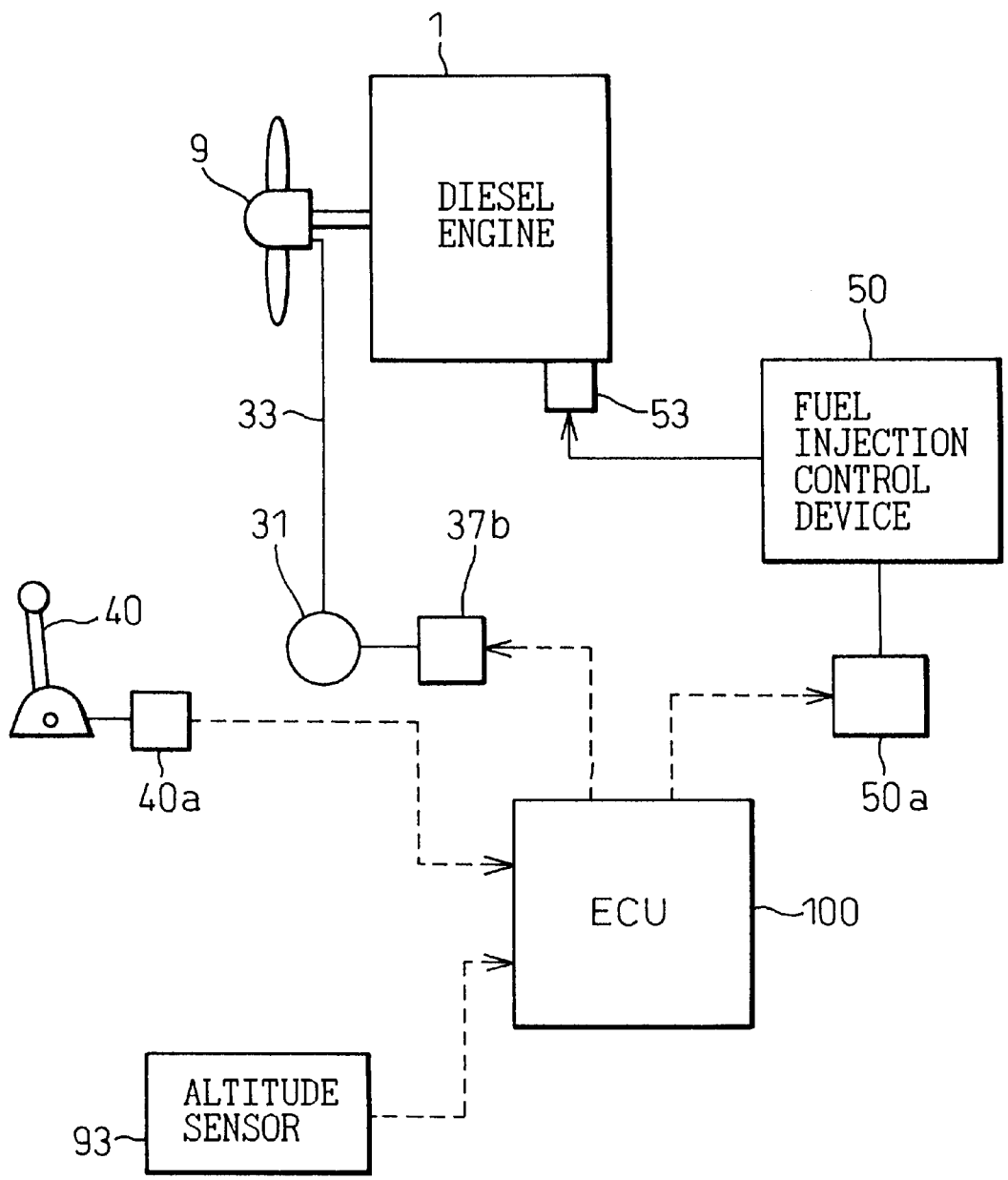
FIG. 10 shows an arrangement of the control device according to the present invention using an electronic control system.

FIG. 10 shows an embodiment of the present invention in which an electronic control system is used.

In FIG. 10, reference numerals the same as those in the previous embodiment represent similar elements.

In FIG. 10, numeral 100 designates an electronic control unit (ECU), which comprises, for example, a microcomputer of a known type. In this embodiment, the position of the power lever 40 is converted to a position signal by a stroke sensor 40a, and this signal is supplied to the ECU 100. Further, an altitude signal which represents the flying altitude (or the ambient pressure) of the aircraft is supplied to the ECU 100 by an altitude sensor 93. Further, the fuel injection control device 50 and the speed setting mechanism 37 of the propeller governor 31 are actuated by actuators 50a and 37b controlled by the ECU 100. As the actuators 50a and 37b, for example, an electric type actuator such as a stepper motor is used.

Figure 11:
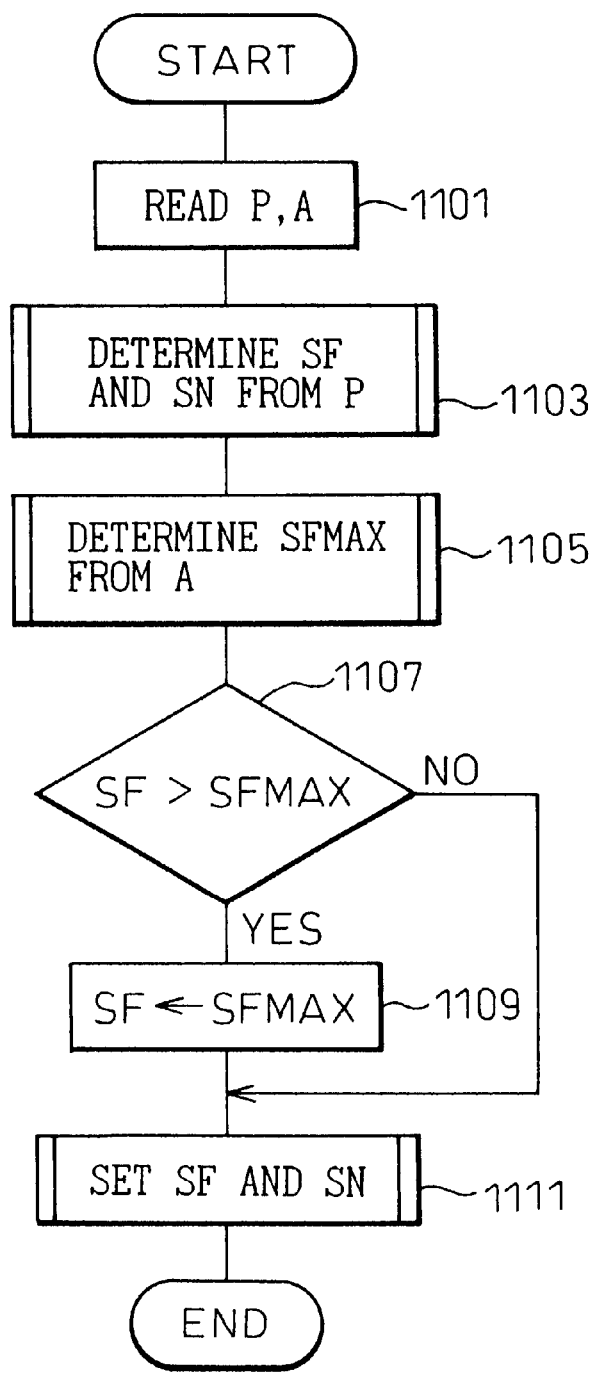
FIG. 11 is a flowchart explaining the control operation performed by the control system in FIG. 10.

FIG. 11 is an example of the flowchart explaining the control operation performed by the ECU 100 in FIG. 10. This control operation is performed by a routine executed by the ECU 100 at predetermined intervals.

In FIG. 11, at step 1101, the ECU 100 reads the stroke P of the power lever 40 and the altitude A of the aircraft from the stroke sensor 40a and the altitude sensor 93, respectively.

At step 1103 the ECU 100 determines the set amount SF of the fuel injection and the set speed SN from the stroke P of the power lever 40. In this embodiment, the relationship between SF and P and the relationship between SN and p are determined in such a manner that the relationship between the set amount SF of fuel injection and the set speed SN is represented by the solid line S in FIG. 2 in order to suppress the generation of the exhaust smoke.

At step 1105, the altitude fuel limit SFMAX is determined from the altitude A based on the relationship in FIG. 3 in order to prevent an over-speed of the turbocharger.

At steps 1107 and 1109, the set amount SF of the fuel injection calculated at step 1103 is restricted so that it does not exceed the altitude fuel limit SFMAX calculated at step 1105.

At step 1111, the set amount SF, after it is restricted by the steps 1107 and 1109, and the set speed SN are fed to the actuators 50a and 37b of the fuel injection control device 50 and the speed setting mechanism 37, respectively.

According to the electronic control system in the present embodiment, the exhaust smoke is effectively suppressed without causing instability in the operation of the engine over the entire flight altitude range.

What is claimed is:

1. A control system for a turbo-charged diesel aircraft engine comprising:

a controllable pitch propeller connected to and driven by the turbo-charged diesel aircraft engine;

a propeller governor for controlling the rotational speed of the propeller to a set speed by adjusting the pitch of the propeller;

speed setting means for changing the set speed of the propeller governor;

accelerator means for changing a set amount of fuel supplied to the engine;

fuel supply means for supplying fuel to the engine by an amount determined in accordance with the set amount;

control means for controlling the speed setting means and the accelerator means so that the set speed and the set amount of fuel change simultaneously in accordance with the stroke of a single control lever;

wherein the control means controls the speed setting means and the accelerator means in such a manner that the set speed and the set amount of fuel maintain a predetermined fixed relationship in which the set amount of fuel always becomes smaller than a smoke limit value at the maximum design altitude of the aircraft and is determined by the set speed; and wherein the control means further comprises an altitude compensator that replaces the set amount of fuel determined by the fixed relationship with an altitude fuel limit determined by the present altitude of the aircraft when the set amount of fuel determined by the fixed relationship is larger than the altitude fuel limit.

2. A control system for a turbo-charged diesel aircraft engine as set forth in claim 1, wherein the altitude fuel limit is defined as the amount of fuel when the rotational speed of the turbocharger reaches a predetermined upper limit speed and when the engine is operated at a maximum rated speed at the present altitude of the aircraft.

3. A control system for a turbo-charged diesel aircraft engine as set forth in claim 2, wherein the control means further comprises a boost compensator that replaces a value of the set amount of fuel determined by the fixed relationship with a boost pressure fuel limit determined by an actual boost pressure of the engine when the value of the set amount of fuel determined by said fixed relationship is larger than the boost pressure fuel limit.

4. A control system for a turbo-charged diesel aircraft engine as set forth in claim 3, wherein the boost compensator comprises a housing and a diaphragm disposed in the housing and defining a boost pressure chamber, to which the boost pressure of the engine is introduced, and a backpressure chamber wherein the pressure is maintained at a predetermined constant pressure, within the housing, and wherein the diaphragm deflects in accordance with the difference in the pressures in the boost pressure chamber and the backpressure chamber, and wherein the boost pressure fuel limit is determined in accordance with the amount of deflection of the diaphragm.

5. A control system for a turbo-charged diesel aircraft engine as set forth in claim 4, wherein the predetermined constant pressure in the backpressure chamber is a pressures lower than the atmospheric pressure on the ground.

6. A control system for a turbo-charged diesel aircraft engine as set forth in claim 4, wherein the altitude compensator comprises a relief valve which controls the pressure in the boost pressure chamber of the boost compensator in such a manner that the pressure in the boost pressure chamber does not exceed an upper limit pressure determined by the present altitude of the aircraft, and wherein the altitude fuel limit at the present altitude is defined as the boost pressure fuel limit when the pressure in the boost pressure chamber becomes the upper limit pressure.

* * * * *